US009449407B2

(12) United States Patent
Bailiang et al.

(10) Patent No.: US 9,449,407 B2
(45) Date of Patent: Sep. 20, 2016

(54) DISPLAYING DYNAMIC CONTENT ON A MAP BASED ON USER'S LOCATION AND SCHEDULED TASK (71) Applicant: GOOGLE INC., Mountain View, CA (US)

(72) Inventors: Zhou Bailiang, Balgowlah (AU); Sascha Benjamin Brawer, Bern (CH)

(73) Assignee: GOOGLE INC., Mountain View, CA (US)

( * ) Notice: Subject to any disclaimer, the term of this patent is extended or adjusted under 35 U.S.C. 154(b) by 577 days.

(21) Appl. No.: 13/736,608

(22) Filed: Jan. 8, 2013

(65) Prior Publication Data

US 2014/0192056 A1  Jul. 10, 2014

(51) Int. Cl.
G06T 11/20 (2006.01)
G01C 21/36 (2006.01)
G09B 29/10 (2006.01)
G06Q 10/10 (2012.01)
G09B 29/00 (2006.01)
G06Q 10/06 (2012.01)

(52) U.S. Cl.
CPC ......... *G06T 11/206* (2013.01); *G01C 21/3682* (2013.01); *G06Q 10/06* (2013.01); *G06Q 10/109* (2013.01); *G06Q 10/1095* (2013.01); *G09B 29/007* (2013.01); *G09B 29/106* (2013.01)

(58) Field of Classification Search
None
See application file for complete search history.

(56) References Cited

U.S. PATENT DOCUMENTS

| 7,385,501 | B2 | 6/2008 | Miller et al. |
| 8,103,445 | B2 | 1/2012 | Smith et al. |
| 2008/0167937 | A1* | 7/2008 | Coughlin et al. ................. 705/9 |
| 2010/0111377 | A1* | 5/2010 | Monroe ........................ 382/118 |
| 2010/0179750 | A1 | 7/2010 | Gum |
| 2011/0130958 | A1 | 6/2011 | Stahl et al. |
| 2011/0313657 | A1 | 12/2011 | Myllymaki et al. |
| 2012/0203457 | A1 | 8/2012 | Casey et al. |
| 2012/0265433 | A1* | 10/2012 | Viola et al. .................... 701/410 |

FOREIGN PATENT DOCUMENTS

WO     WO-01/29573 A2    4/2001

OTHER PUBLICATIONS

International Search Report and Written Opinion for Application No. PCT/US2014/010436, dated Mar. 19, 2014.
International Preliminary Report on Patentability for Application No. PCT/US2014/010436, dated Jul. 23, 2015.

* cited by examiner

*Primary Examiner* — Mark Zimmerman
*Assistant Examiner* — Sarah Le
(74) *Attorney, Agent, or Firm* — Marshall, Gerstein & Borun LLP (57) ABSTRACT Graphic elements for a computer-implemented mapping system may be displayed based on scheduled task data, routine data, or other data corresponding to an application of a client computing device. The application data may include a location and a scheduled time. A user may request a map for the scheduled task location. If a difference between the request time and the scheduled task time is below a threshold, then the mapping system may display or modify graphic elements for the location that are relevant to the scheduled task. For example, a user may include appointment data for an airline flight in a calendar application of a mobile computing device. If the user requests a map of the departure airport within a short amount of time before the flight, the map may include only relevant graphic elements such as a check in counter, a security checkpoint, and a departure gate.

17 Claims, 6 Drawing Sheets

FIG. 4

DISPLAYING DYNAMIC CONTENT ON A MAP BASED ON USER'S LOCATION AND SCHEDULED TASK

FIELD OF TECHNOLOGY

The present disclosure relates to electronic map systems, and more specifically to a mapping system that displays map elements based on a user's location and scheduled task.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Current online maps show the maps in a static state. Vectors describing both the map content and styling are sent to a user device in response to a request for specific locations. The data sent to the user device only represents the map data as it exists on the backend mapping servers. Thus, if two users made a request for mapping data and each request included the same location, the backend mapping servers would return identical or nearly identical information. While these static maps may be useful for general viewing, they may not be appropriate in other dynamic contexts.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A method for displaying graphic elements on a digital map based on application data generated or received by an application executing on a client computing device may send a mapping data request from the client computing device via a network connection. The mapping data request may include a geographic location and a request time. The method may also receive a vector in response to the mapping data request. The received vector may include mapping data corresponding to the geographic location. Further, the mapping data may include a plurality of graphic elements that represent the geographic location. The method may then retrieve application data generated or received by an application executing on the client computing device. The application data may include an application data time and an application data location, and the mapping data request geographic location may correspond to the application data location. The method may determine a difference between the application data time to the request time, modify the received mapping data based on the retrieved application data and the difference between the application data time to the request time, and display the modified mapping data on the client computing device.

In a further embodiment, a method may generate mapping data for display at a client computing device based on application data corresponding to an application executing on a client computing device. The method may receive a mapping data request from a client computing device via a network connection. The mapping data request may include a geographic location, a request time, and application data generated or received by the application executing on the client computing device. The application data may include an application data time and an application data location, and the mapping data request geographic location may correspond to the application data location. The method may also retrieve mapping data that corresponds to the mapping data request geographic location and determine that a difference between the application data time and the request time is below a threshold. The method may then modify the retrieved mapping data based on the received application data and the determined time difference, generate a vector that includes the modified retrieved mapping data, and send the vector to the client computing device via the network connection.

In a still further embodiment, a system may display graphic elements for mapping data of a digital map based on application data. The system may include a user task system and a mapping system. The user task system may include a processor and memory. The user task system memory may store user scheduled task data that is generated or received by an application executing on a client computing device. The user scheduled task data may include a task time and a task location. The mapping system may include a processor and a memory, also. The mapping system memory may store mapping data that includes a plurality of graphic elements to represent a geographic location using a mapping application of a client computing device. The mapping system memory may also store instructions for execution by the mapping system processor. One instruction may receive a mapping data request from the client computing device via a network connection. The mapping data request may include a geographic location and a request time. The mapping data request geographic location may correspond to the task location. Another instruction may retrieve mapping data that corresponds to the mapping data request geographic location. A further instruction may determine that a difference between the task time and the request time is below a threshold and modify the retrieved mapping data based on the received task location and the determined time difference. Also, an instruction may generate a vector that includes the modified retrieved mapping data, and send the vector to the client computing device via the network connection.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Embodiments of systems and methods for displaying dynamic map content based on a user's location and scheduled task are discussed below. To produce a standard map image of a location in a mapping application, or another application, a client computing device may send a mapping request to a map server via a communication network, and the map server in response may provide vector-based map data that allows the mapping application executing on the client computing device to render graphic map elements. In particular, the vector map data may specify various geometric shapes (e.g., using mathematical descriptions) for graphic elements and features of a digital map and indicate how these shapes should be positioned for rendering various map features such as roads, buildings, parks, etc., on the client computing device. To produce a customized map image of a location, dynamic map content may be rendered by referencing the user's scheduled task and/or the user's preference in order to specify which visual styles to apply to the various map features so that the most relevant features are displayed or highlighted, thereby providing more targeted and useful information to the user.

Data regarding the user's scheduled task may include a task time and a task location for various user defined tasks or events (e.g., taking a scheduled flight, going to a doctor's office, attending a birthday party, etc.). By referencing the user's scheduled task in a mapping request, the map server or the client device may show map elements based on the time difference between the current real time and the time for the scheduled task, and the relationship between the current mapping request geographic location and the task location. For example, if the user's scheduled task involves taking a flight from an airport that is scheduled on a calendar application executing on the user's mobile computing device, and the user makes a mapping request at the airport using a mapping application on the mobile computing device with ample time before flight departure, then a map returned to the device may include vector data to show relevant map elements such as a check-in counter, a security gate, a restaurant, a currency exchange or other places of interests for the user. However, if the user makes the mapping request very close in time to the flight departure time, then the data returned to the mobile device in response to the request may only show relevant map elements that are essential for the user to get to the flight quickly such as the check-in counter or security gate.

In another example, if the user's scheduled task involves taking a flight from an airport that is scheduled on a calendar application running on the user's mobile computing device, but the user makes a mapping request on the way to the airport using a mapping application on the mobile computing device with ample time before flight departure, then a map returned to the device may include vector data to show relevant map elements such as a taxi stand, a bus stop, or other transportation stations necessary for the user to get to the airport. However, if the user makes the mapping request very close in time to the flight departure time, then the data returned to the mobile device in response to the request may only show relevant map elements that essential for the user to get to the airport quickly such as the taxi stand.

In addition to or in the absence of user defined tasks or events, data regarding the user's daily routines or activities (e.g., a train station used by the user to get to work every morning, a gym visited by the user on weekend afternoons, etc.) may form the basis for the user's scheduled task, which may include a routine time and a routine location. By referencing the user's daily routine in a mapping request, the map server or the client device may show map elements by matching the current real time to the routine time, and the current mapping request geographic location to the routine location. For example, if the user is driving near work on a weekday afternoon and makes a mapping request using a mapping application on the user's mobile computing device, then a map returned to the device in response to the request may include vector data to show relevant map elements such as a bank, a post office or other places that the user may visit regularly during weekday afternoons. In another example, if the user is driving near home on a weekend morning and makes a mapping request using a mapping application on the user's mobile computing device, then a map returned to the device in response to the request may include vector data to show relevant map elements such as a grocery store, a park, or other places that the user may visit regularly during weekend mornings.

In showing the relevant map elements, data regarding the user's preference may be incorporated into a request for mapping data, the data returned in response to a mapping request, or a combination of the request and returned data to provide a more personalized map viewing experience. Information on the user's interests, likes/dislikes, habits, behaviors, etc. (e.g., a favorite type of restaurant, an interest in classical music, a smoking habit, etc.) may be referenced so that the map server sends data and/or the client device shows relevant personalized elements for the user. For example, in the airport example described above, if the user makes a request for mapping data at the airport with ample time before flight departure, then the returned mapping data may show relevant map elements such as the check-in counter or the currency exchange but also relevant personalized elements such as a smoking lounge if the user preference data indicates that the user is a habitual smoker.

Figure 1A:
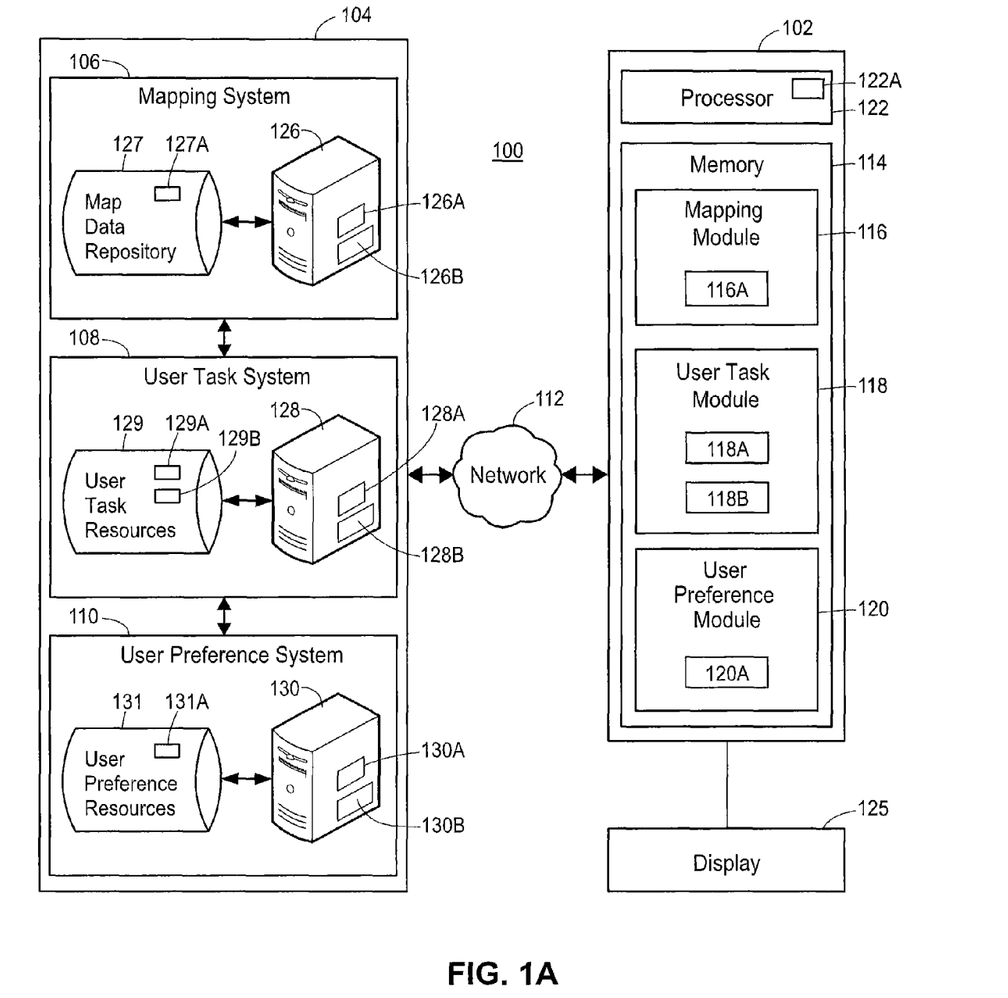
FIG. 1A is a block diagram of a system for displaying dynamic map content based on a user's location, scheduled task and preference on a mobile computing device.

FIG. 1A is a high-level block diagram that illustrates a system 100 for displaying dynamic map content based on a user's location, scheduled task and preference. Generally speaking, the system 100 may include a client computing device 102 (e.g., a smart phone, a tablet computer, a personal computer, etc.) communicating with backend components 104 including a mapping system 106, a user task system 108, and a user preference system 110 via a network connection 112 (e.g., a local area network, a wide area network, a mobile network, a wired or wireless network, a private network, etc.). The mapping system 106 may be communicatively coupled to the user task system 108 and the user preference system 110. Generally speaking, the client computing device 102 may include a memory 114 storing a mapping module 116, a user task module 118, and a user preference module 120 that are executed by a processor 122 with a processor clock 122A.

The mapping system 106 may include a map server 126, which may be in the form of one or more servers including a processor and a memory storing instructions to send and receive map data 127A from a map data repository 127. In response to a mapping data request from the mapping module 116 executing on client device 102, a processor 126A of the map server 126 may execute instructions 126B to retrieve and send map data 127A for a digital map image to be displayed in a display component 125 of the client device 102. To render the digital map with dynamic map content, the mapping module 116 may execute instructions 116A to reference application data and send the application data along with a mapping data request. The application data may include one or more of data associated with the user's scheduled task (scheduled task data 118A, routine data 118B) or data associated with the user's preference (user preference data 120A).

One or more of the client computing device 102 or the backend components 104 may only collect the scheduled task data 118A, routine data 118B, or user preference data 120A with a user's full understanding and acceptance to published terms and conditions for collection and use of that data. For example, before one or more elements of the computing device 102 or the backend components 104 executes an instruction to collect or use this data, a visual or other prompt at the client computing device 102 may alert the user to such action. The prompt allows the user to "opt out" of some or all collection of scheduled task data 118A, routine data 118B, user preference data 120A, or any other data as described herein.

Scheduled task data 118A may be stored in the user task module 118 and collected from a variety of applications such as a calendar application, a trip planning application, or other application sources executing on or in communication with the client device 102. Daily routine data 118B may include data associated with the user's typical daily routines or activities (e.g., a mass transit station used to go to work every morning, a restaurant visited regularly during lunch break, etc.). The Daily routine data 118B may be stored in the user task module 118 and collected from various applications such as a user activity tracking application, a search history application, or other application sources executing on or in communication with the client device 102. User preference data 120A indicating the user's interests, likes/dislikes, habits, etc., may be stored in the user preference module 120 and collected from various applications such as a user profile application, a user activity tracking application, or other application sources executing on or in communication with the client device 102.

In some embodiments, scheduled task data 118A, daily routine data 118B, and user preference data 120A may, at the user's option and understanding, be collected and stored in the backend components 104. The user task system 108 may include one or more user task servers 128 and various user task resources 129. Data associated with the user's scheduled task may be collected from the user task resources 129 and stored as scheduled task data 129A. Data associated with the user's daily routines or activities may also be collected from the user task resources 129 and stored as daily routine data 129B. A processor 128A of the user task server 128 may execute instructions 128B to send and receive the scheduled task data 128A and the daily routine data 129B from the user task resources 129. The user preference system 110 may include one or more user preference servers 130 and various user preference resources 131 (e.g., a user profile application, a social networking application, etc.). Data associated with the user's preference may be collected from the user preference resources 131 and stored as user preference data 131A. A processor 130A of the user preference server 130 may execute instructions 130B to send and receive the user preference data 131A from the user preference resources 131.

In some embodiments, scheduled task data 118A, daily routine data 118B, or user preference data 120A may be collected from applications executing on the client device 102 and "pushed" to the backend to be stored in the user task system 108 and the user preference system 110. In other embodiments, scheduled task data 129A, daily routine data 129B, or user preference data 131A may be collected in the backend and "pulled" to the frontend to be stored in the client device 102. In still other embodiments, scheduled task data (i.e., 118A, 129A), daily routine data (i.e., 118B, 129B), or user preference data (i.e., 120B, 131B) may be collected and stored among the frontend client device 102, and the backend user task system 108 and user preference system 110.

In one embodiment, the client device 102 may send a request for mapping data to the mapping system 106 to display a map on the device 102. In response to the request, the map server 126 may retrieve and send map data 127A to the mapping module 116. The mapping module 116 may then process the received map data 127A and render dynamic map content on the map by referencing a combination of scheduled task data, daily routine data, and user preference data stored in either the client device 102 or the backend user task system 108 and user preference system 110. In another embodiment, the client device 102 may send a request for mapping data to the mapping system 106 to display a map on the device 102. In response to the request, the map server 126 may first retrieve and process map data 127A and render dynamic map content on the map by referencing a combination of scheduled task data, daily routine data, and user preference data stored in either the client device 102 or the backend user task system 108 and user preference system 110. The map server 126 may then send the map rendered with dynamic map content to the mapping module 116 for subsequent display on the client device 102.

In some embodiments, the mapping module 116 may receive map data in the form of graphic components, text, and other data. The received data may include vector data that specifies the map features such as geometric shapes using mathematical descriptions of points and paths connecting the points. For example, rather than specifying each pixel that makes up a raster image of a line segment or other graphic elements, vector data may specify the two endpoints of the line segment and indicate that the two endpoints are connected by a straight line. The mapping module 116 then may apply style and other data as appropriate to the specified line segment, so that the line segment is displayed with a particular title, description, etc. As another example, the vector data may specify the contour of a building, and corresponding text data may specify the name, description, web page, contact information, address, etc., of the building. In other words, rather than receiving raster images from the map server 126, the mapping module 116 may receive instructions for drawing a map image on the display component 125 of the client device 102 and execute the instructions to generate a raster map image.

For simplicity, the client device 102 is illustrated with a single processor 122 to execute various modules stored in the device memory 114, as described herein. The client device 102 in other embodiments may include additional processing units (not shown) such as a graphics processing unit (GPU) configured to facilitate image rendering on the display component 125, for example. Further, the mapping module 116 may utilize a library of graphics functions for efficiently generating a map image. For example, the memory 114 may store a plugin, such as an OpenGL® or Direct3D® library, having functions for rendering graphics which various applications executing on the client 102, including the mapping module 116, may access via an application programming interface (API). In another embodiment, the memory 114 stores a plugin particularly suitable for browser applications, such as WebGL®, for example. Also, in some embodiments, the memory 114 stores additional software components that facilitate efficient rendering of images via the display 125. For example, the memory 114 may store an Adobe® Flash® plugin or an O3D plugin.

Figure 1B:
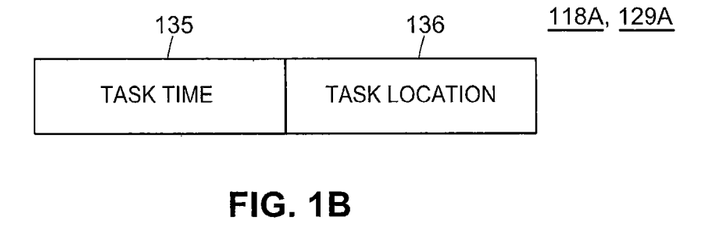
FIG. 1B is a block diagram of a data structure associated with scheduled task data.
Figure 1C:
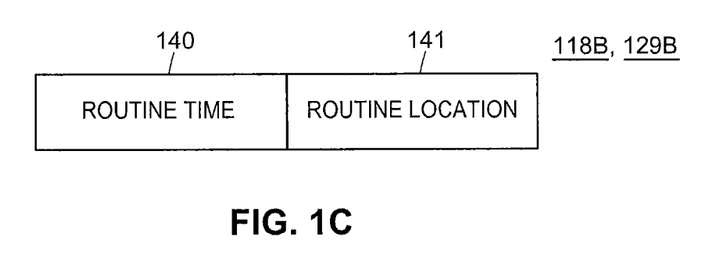
FIG. 1C is a block diagram of a data structure associated with daily routine data.
Figure 1D:
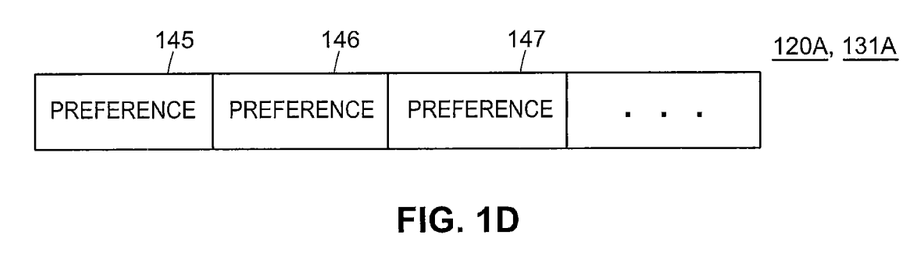
FIG. 1D is a block diagram of a data structure associated with user preference data.

With reference to FIGS. 1B, 1C, and 1D, scheduled task data (i.e., 118A, 129A) may include a task time 135 and a task location 136 for various user defined tasks or events. Daily routine data (i.e., 118B, 129B) may include a routine time 140 and a routine location 141 that correspond to the user's typical daily routines or activities. User preference data (i.e., 120A, 131A) may include preferences 145 to 147, each indicating a preference for the user (i.e., the user's interests, likes/dislikes, habits, etc.). For example, preference 145 may include data that indicate the user enjoys fast food, preference 146 may include data that indicate the user has an interest in classical music, and preference 147 may include data that indicate the user is a habitual smoker. While FIG. 1D illustrates user preference data (i.e., 120A, 131A) as having three user preferences, the data in general may have any number of preferences.

Figure 1E:
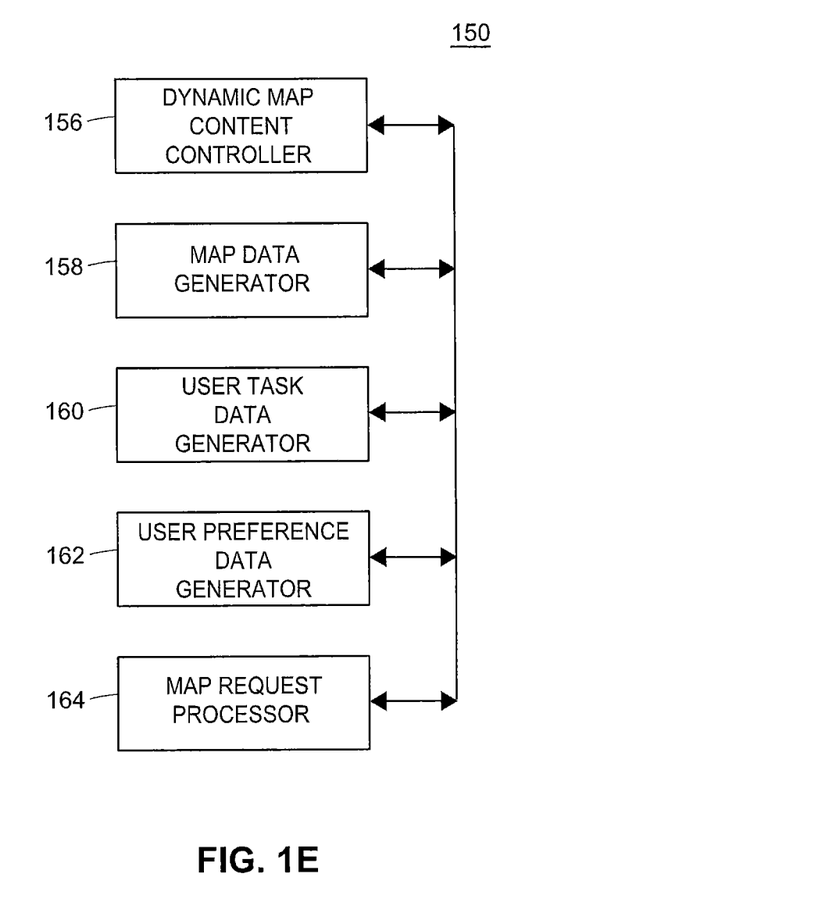
FIG. 1E is a block diagram of a component of the system for displaying dynamic map content to a mobile computing device.

With reference to FIG. 1E, a map controller 150 of the client device mapping module 116 or the backend map server 126 may include various functions to process and render a map with dynamic map content based on the user's location, scheduled task and preference. According to an embodiment, the map controller 150 may operate as a set of instructions (i.e., 116A, 126B) in either the client device 102 or the mapping system 106, or the various functions may be split among the client device 102 and the mapping system 106.

According to an embodiment, the map controller 150 may include a dynamic map content controller 156, communicatively coupled to a map data generator 158, a user task data generator 160, a user preference data generator 162, and a map request processor 164. After the map request processor 164 receives a request for mapping data to display a map for a geographic location, the map request processor 164 may execute a function call to the map data generator 158 to retrieve map data 127A from the map data repository 127 for the requested geographic location. The map data generator 158 may include instructions to generate the map data as a set of map tile descriptors, such that each map tile descriptor describes a map tile (i.e., a portion of a map image of a certain size). The size of a geographic region represented by an individual map tile depends on the zoom level with which the map tile is associated, so that a single map tile at a lower zoom level illustrates a larger geographic area than a single map tile at a higher zoom level. The map data generator 158 may generate each map tile descriptor according to a vector graphics format, and a client device, such as the client device 102 of FIG. 1A, may locally generate a raster image for each tile.

To render dynamic map content on the map, the map request processor 164 may execute a function call to the user task data generator 160 to access scheduled task data (i.e., 118A, 129A) or daily routine data (i.e., 118B, 129B), which may be retrieved from the client device 102 or the backend user task system 108. The map request processor 164 may also execute a function call to the user preference task generator 162 to access user preference data (i.e., 120A, 131A), which may be retrieved from the client device 102 or the backend user preference system 110.

Figure 2A:
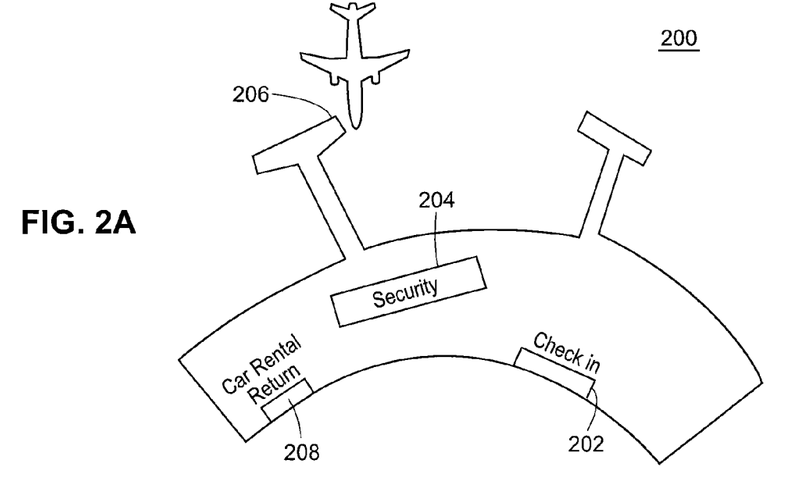
FIG. 2A is an exemplary map generated by the system for displaying dynamic map content to a mobile computing device based on a user' location, scheduled task and preference.
Figure 2B:
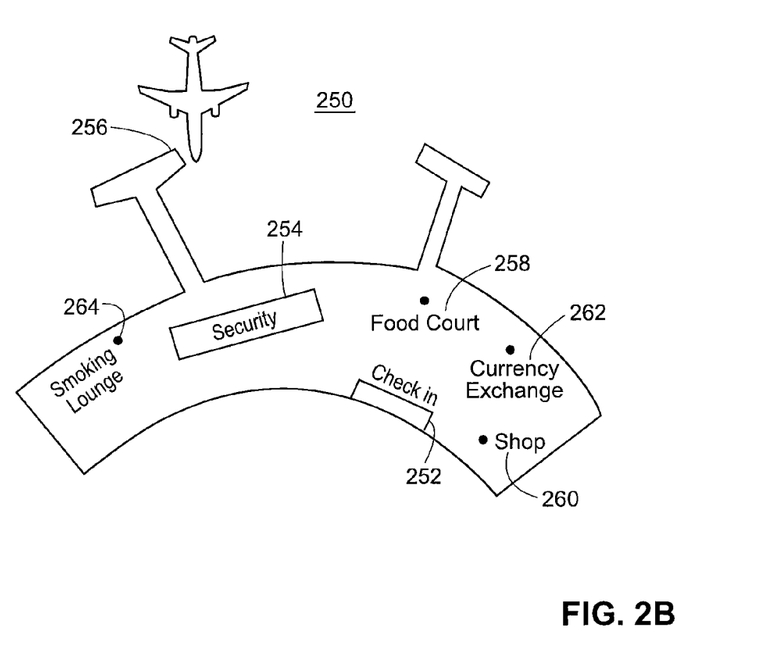
FIG. 2B is another exemplary map generated by the system for displaying dynamic map content to a mobile computing device based on a user' location, scheduled task and preference.

The dynamic map content controller 156 may read scheduled task data (i.e., 118A, 129A) to determine from the time difference between the current real time (e.g., determined from the processor clock 122A) and the task time, and the relationship between the current mapping request geographic location and the task location. Based on this information, the dynamic map content controller 156 may decide which map features to display or highlight on the map. In addition, the dynamic map content controller 156 may read the user preference data (i.e., 120A, 131A) to determine user-tailored map features in order to provide the user with a more personalized map viewing experience. The dynamic map content controller 156 may also read daily routine data (i.e., 118B, 129B) to match the current real time (e.g., determined from the processor clock 122A) to the routine time, and the current mapping request geographic location to the routine location. The dynamic map content controller 156 may then determine the relevant map features to display or highlight on the map. For example, with reference to FIG. 2A, the system 100 determines that the user has a scheduled task that corresponds to taking a flight from an airport in five hours time. If the user arrives at the airport in four hours time (i.e., one hour prior to the fight departure) and requests to view a map of the airport, then the dynamic map content controller 156 may render an airport map 200 to show relevant map elements that are essential to the scheduled task with respect to the short period before flight departure (e.g., check-in counter 202, security gate 204, boarding gate 206, car rental return 208, etc.). With reference to FIG. 2B, if the user arrives at the airport in one hour time, (i.e., four hours prior to the flight departure) and requests to view a map of the airport, then the dynamic map content controller 156 may render an airport map 250 to show more relevant map elements for the scheduled task with respect to the longer period before flight departure (e.g., check-in counter 252, security gate 254, boarding gate 256, food court 258, shop 260, currency exchange 262, etc.). In addition, the dynamic map content controller 156 may incorporate data associated with the user's preference to personalize the map view by showing personalized map elements for the user such as a smoking lounge 264 if the data in the user's preference indicates that the user is a smoker.

Figure 3:
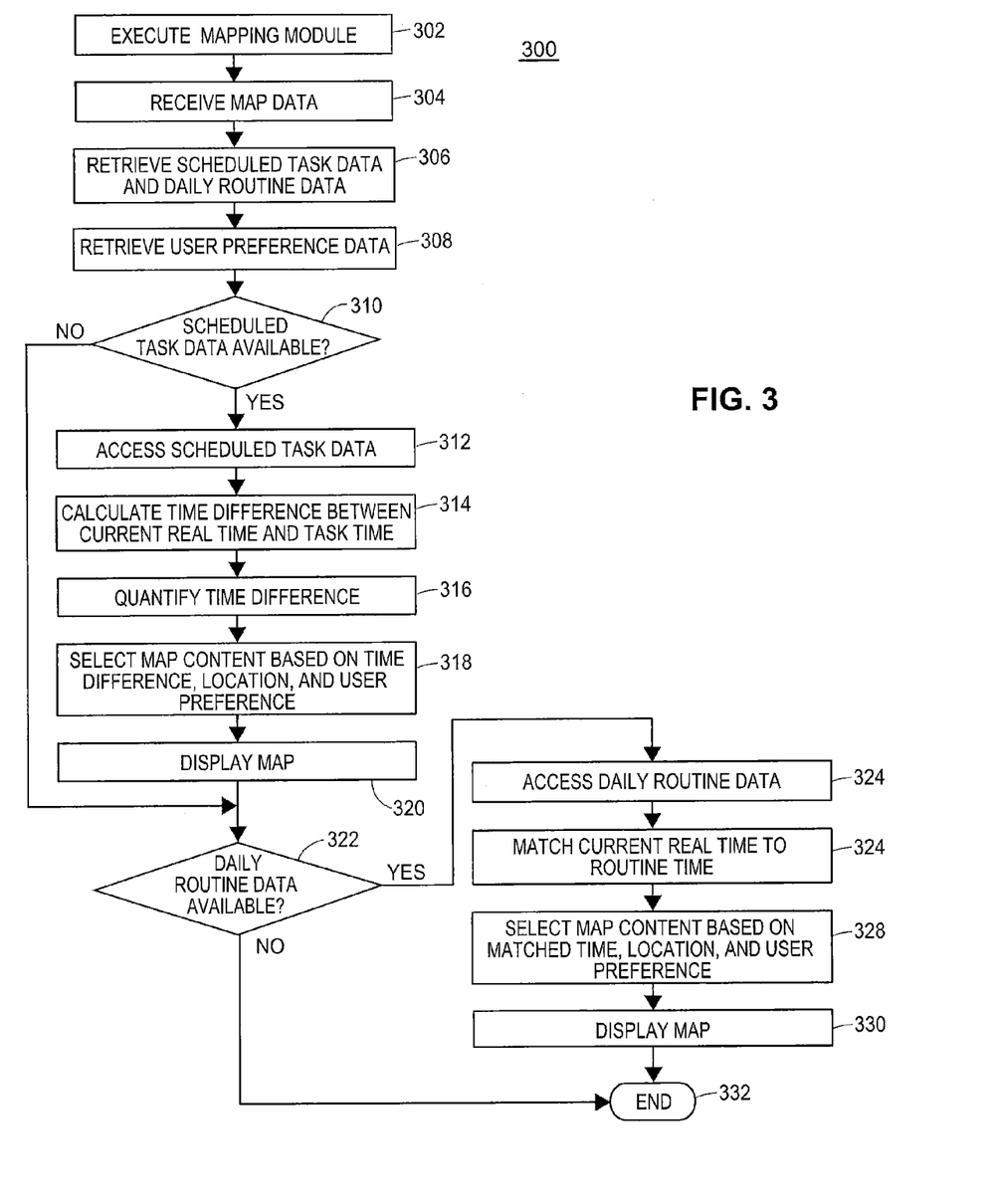
FIG. 3 is an exemplary flow chart of a method for displaying dynamic map content, as described herein.

FIG. 3 is a flow diagram of an example method 300 for displaying dynamic map content in a digital map based on a user's location, scheduled task and preference. The method 300 may include one or more blocks, routines or functions in the form of computer-executable instructions that are stored in a tangible computer-readable medium (e.g., 116A, 126B, 128B, 130B) and executed using the processor 122 of the client device 102 or one or more of the backend server processors (e.g., 126A, 128A, 130A). The method 300 may execute at either the frontend device 102 or the backend components 104. FIG. 3 will be described with reference to FIGS. 1A, 1B, 1C, 1D, 1E, 2A, and 2B for ease of explanation, but the method 300 may of course be utilized with other objects and user interfaces.

At block 302, the mapping module 116 of the client device 102 may execute an operation. For example, the mapping module 116 may execute a function call to the mapping system 106 via the network 112 to request map data 127A to be sent to the mapping module 106 to display a map within the display component 125 of the device 102.

At block 304, the mapping module 116 may receive the requested map data 127A (i.e., map tile data) sent from the mapping system 106 once the system 106 matches a geographic location of the request to the map data 127A and the system 106 sends the matched data to the client device 102. In some embodiments, the system 106 may send the matched data in a vector format, as described herein. The received map data 127A may include a plurality of graphic elements that, when rendered by the client device, depict various map features (e.g., a building, a store, an airport check in counter, airport security checkpoint, an airport gate location, a train station, etc.).

To render dynamic map content on the map displayed at the client device 102, the method 300 may cause instructions to be executed at block 306 to retrieve application data from either the client device 102 or the user task system 108. The application data may include one or more of scheduled task data (i.e., 118A, 129A) and daily routine data (i.e., 118B, 129B). At block 308, the method 300 may cause instructions to be executed to retrieve user preference data (i.e., 120A, 131A) from either the device 102 or the user preference system 110.

At block 310, the method 300 may determine whether scheduled task data (i.e., 118A, 129A) is available. If scheduled task data (i.e., 118A, 129A) is available, then the method 300 may proceed to block 312 to read the scheduled task data (i.e., 118A, 129A) retrieved in block 306 and determine the task time 135 and task location 136. At block 314, the method 300 may calculate a time difference between the current real time (e.g., determined from the processor clock 122A) and the task time 135. The method 300 may then proceed to block 316 to quantify the time difference to determine if there is a large amount of time before the task time 135 (e.g., a couple of hours before the task time), or if there is a small amount of time before the task time 135 (e.g., an hour before the task time).

At block 318, if the time difference is large (e.g., the time difference is above or below a threshold), then the method 300 may cause instructions to be executed to modify the received map data. In some embodiments, block 318 may include instructions to modify an appearance of a graphic element of the map or select relevant map elements from the received map tile data based on the large time difference, the current mapping request geographic location in relation to the task location 136, and preferences (e.g., 145, 146, 147) in the user preference data (i.e., 120A, 131A) retrieved in block 308. For example, if the scheduled task data includes an appointment for an airline reservation in a calendar or other scheduling application executing on the client device, then the relevant graphic elements of a map for the airport may include a rental car return, a check in, a security checkpoint, and a gate. However, if the time difference is small, then the method 300 may cause instructions to be executed to select relevant map elements that are essential based on the small time difference, the current mapping request geographic location in relation to the task location 136, and preferences (e.g., 145, 146, 147) in the user preference data (i.e., 120A, 131A) retrieved in block 308. The method 300 may then proceed to block 320 to execute instructions for displaying the map elements within a map displayed on the client computing device.

Subsequently, the method 300 may proceed to block 322 to determine whether daily routine data (i.e., 118B, 129B) is available. If daily routine data (i.e., 118B, 129B) is available, then the method 300 may proceed to block 324 to read the daily routine data (i.e., 118B, 129B) retrieved in block 306 and determine the routine time 140 and routine location 141. At block 326, the method 300 may match the current real time (e.g., determined from the processor clock 122A) and the routine time 140 before moving to block 328, where instructions may be executed to select relevant map elements based on a successful matching between the current real time and the routine time 140, as well as the current mapping request geographic location in relation to the routine location 141, and preferences (e.g., 145, 146, 147) in the user preference data (i.e., 120A, 131A) retrieved in block 308. The method 300 may then proceed to block 330, where instructions may be executed to show the map elements for display on the map. The method may terminate at block 332.

If scheduled task data (i.e., 118A, 129A) is determined to be not available at block 310, then the method 300 may proceed directly to block 322 to determine whether daily routine data (i.e., 118B, 129B) is available. If daily routine data (i.e., 118B, 129B) is determined to be not available at block 322, then the method 300 may terminate at block 332.

Using the system 100 and method 300 described herein, an electronic map system may be implemented for displaying dynamic map content on a map based on a user's location, scheduled task and preference. By referencing data associated with the user's scheduled task and preference in response to a request for mapping data for specific locations, the styling and appearance of graphical map elements may be rendered to provide more targeted and useful information to the user.

Figure 4:
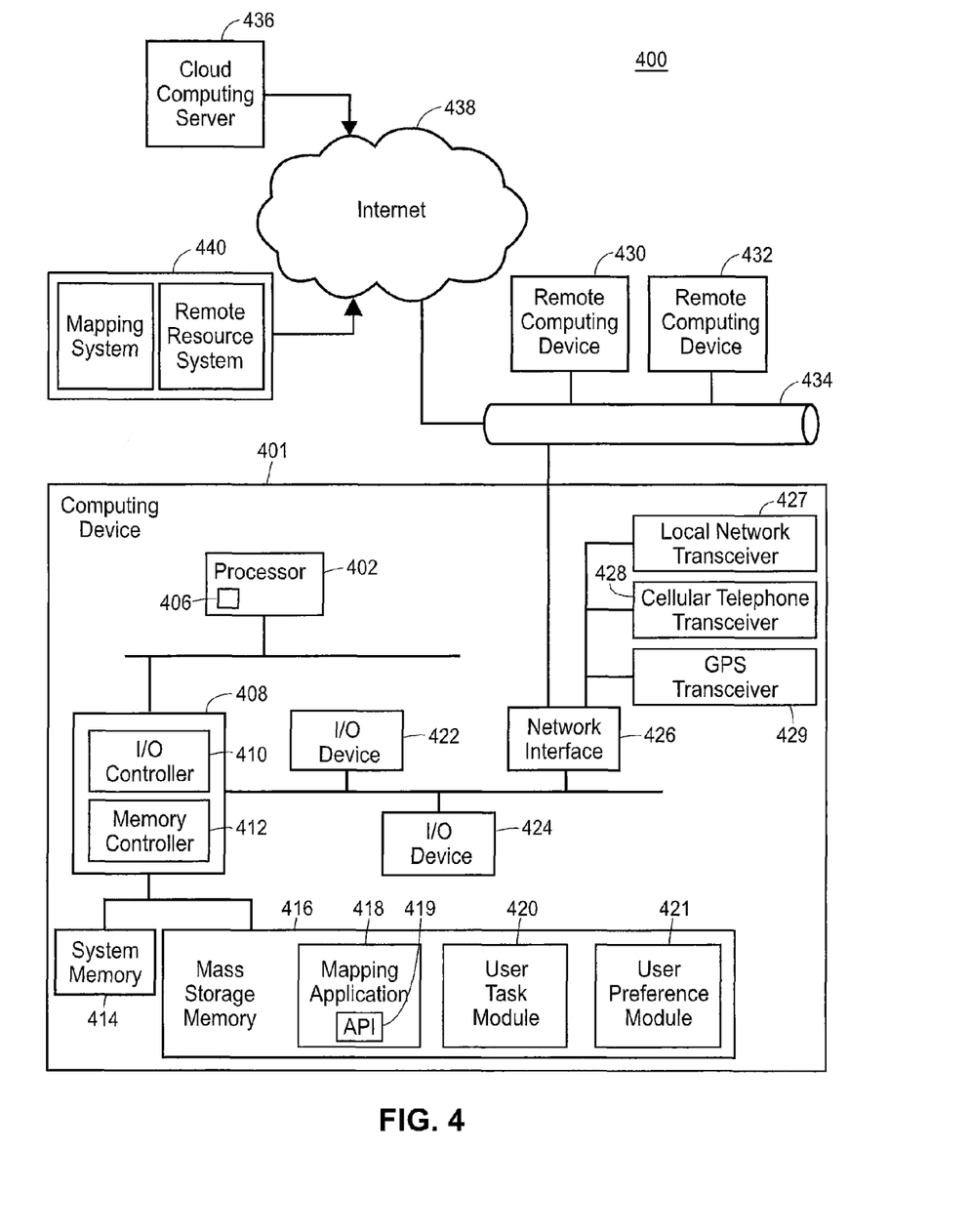
FIG. 4 is a block diagram of a computing environment that implements a system and method for displaying dynamic map content on a computing device.

FIG. 4 is a high-level block diagram of an example computing environment for a mobile mapping system 400 having a computing device 401 that may be used to implement the method and systems described herein. The computing device 401 may include a mobile computing device 102 (e.g., a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 400 may be used to implement and execute the example system of FIG. 1A, the data structures of FIGS. 1B, 1C, 1D, 1E, the method of FIG. 3, and the like. Although the example mobile mapping system 400 is described below as including a plurality of peripherals, interfaces, chips, memories, etc., one or more of those elements may be omitted from other example processor systems used to implement and execute the example system 100 to display dynamic map content based on the user's location, scheduled task and preference. Also, other components may be added.

As shown in FIG. 4, the computing device 401 includes a processor 402 that is coupled to an interconnection bus 404. The processor 402 includes a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 is coupled to a chipset 408, which includes a memory controller 410 and a peripheral input/output (I/O) controller 412. As is well known, a chipset typically provides I/O and memory management functions as well as a plurality of general purpose and/or special purpose registers, timers, etc. that are accessible or used by one or more processors coupled to the chipset 408. The memory controller 410 performs functions that enable the processor 402 (or processors if there are multiple processors) to access a system memory 414 and a mass storage memory 416, that may include either or both of an in-memory cache (e.g., a cache within the memory 414) or an on-disk cache (e.g., a cache within the mass storage memory 416).

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement a mapping application 418 having an API 419, a user task module 420, and a user preference module 421. The mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the mobile mapping system 400. Thus, a module, block, function, operation, procedure, routine, step, and method can be implemented in hardware, firmware, and/or software. In one embodiment, program modules and routines (e.g., the mapping application 418, the API 419, the user task module 420, the user preference module 421, etc.) are stored in mass storage memory 416, loaded into system memory 414, and executed by a processor 402 or can be provided from computer program products that are stored in tangible computer-readable storage mediums (e.g. RAM, hard disk, optical/magnetic media, etc.).

The peripheral I/O controller 410 performs functions that enable the processor 402 to communicate with peripheral input/output (I/O) devices 422 and 424, a network interface 426, a cellular network transceiver 427, a local network transceiver 428, and a GPS transceiver 429 (via the network interface 426) via a peripheral I/O bus 428. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 422 and 424 may be used with the mapping application 418, the user task module 420, and the user preference module 421 to receive GPS data from the GPS transceiver 429, send the GPS data to the backend components of the system 100, render, and display maps and user interfaces as described in relation to the figures. A cellular telephone transceiver 427 may be resident with the local network transceiver 428. The local network transceiver 428 may include support for a Wi-Fi network, Bluetooth, Infrared, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 428 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The mobile mapping system 400 may also implement the mapping application 418, the user task module 420, and the user preference module 421 on remote computing devices 430 and 432. The remote computing devices 430 and 432 may communicate with the computing device 401 over an Ethernet link 434. For example, the computing device 401 may receive mapping data created by a mapping application executing on a remote computing device 430, 432. In some embodiments, the mapping application 418, the user task module 420 and/or the user preference module 421 may be retrieved by the computing device 401 from a cloud computing server 436 via the Internet 438. When using the cloud computing server 436, the retrieved mapping application 418, the user task module 420 and/or the user preference module 421 may be programmatically linked with the computing device 401. The mapping application 418, the user task module 420 and/or the user preference module 421 may be a Java® applet executing within a Java® Virtual Machine (JVM) environment resident in the computing device 401 or the remote computing devices 430, 432. The mapping application 418, the user task module 420 and/or the user preference module 421 may also be "plug-ins" adapted to execute in a web-browser located on the computing devices 401, 430, and 432. In some embodiments, the mapping application 418, the user task module 420 and/or the user preference module 421 may communicate with back end components 440 such as the mapping system 106, the user task system 108, and the user preference system 110 via the Internet 438.

The system 400 may include but is not limited to any combination of a LAN, a MAN, a WAN, a mobile, a wired or wireless network, a private network, or a virtual private network. Moreover, while only three remote computing devices 430 and 432 are illustrated in FIG. 4 to simplify and clarify the description, it is understood that any number of client computers are supported and can be in communication within the system 400.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for displaying dynamic map content based on the user's location and application data for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for displaying dynamic map content based on the user's location, scheduled task and preference for subsequent display on a mobile computing device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for displaying graphic elements on a digital map based on application data generated or received by an application executing on a client computing device, the method comprising:
    receiving a user mapping request for a digital map on the client computing device;
    sending a mapping data request, corresponding to the user mapping request, from the client computing device via a network connection, the mapping data request including a geographic location and corresponding to a current time;
    receiving, in response to the mapping data request, mapping data for generating a standard map image corresponding to the geographic location, wherein the mapping data includes a plurality of graphic elements that represent the geographic location;
    retrieving application data generated or received by an application executing on the client computing device, wherein the application data includes an application data time, scheduled task data indicating a scheduled task, and an application data location, wherein the mapping data request geographic location corresponds to the application data location;
    determining a difference between the application data time and the current time;
    automatically modifying, without receiving a new user mapping request, the received mapping data to generate a customized map image, including selecting for display or modifying an appearance of one or more graphic elements from the received mapping data that are relevant to the scheduled task based on the retrieved application data and the difference between the application data time and the current time; and
    displaying the modified mapping data on the client computing device.

2. The method of claim 1, wherein determining the difference between the application data time and the current time includes determining that the difference between the application data time and the current time is below a threshold.

3. The method of claim 1, wherein the scheduled task data includes a scheduled task of a calendar application executing on the client device.

4. The method of claim 1, wherein displaying the modified mapping data on the client computing device includes displaying only the relevant graphic elements within the customized map image.

5. The method of claim 1, wherein the scheduled task data includes an airline reservation and the relevant graphic elements include one or more graphic elements representing a rental car return, a check in, a security checkpoint, and a gate.

6. The method of claim 1, further comprising retrieving user preference data, wherein the relevant graphic elements correspond to the retrieved user preference data.

7. The method of claim 1, wherein the application data includes user routine data and modifying the received mapping data based on the retrieved application data includes modifying the received mapping data based on the retrieved user routine data.

8. The method of claim 1, wherein modifying the appearance of one or more graphic elements includes applying a visual style to vector data describing the one or more graphic elements.

9. A method for generating mapping data for display at a client computing device based on application data corresponding to an application executing on a client computing device, the method comprising:
    receiving, by one or more processors at a current time, a mapping data request from a client computing device via a network connection, the mapping data request including a geographic location and application data generated or received by the application executing on the client computing device, wherein the application data includes:
        (i) an indication of a scheduled task,
        (ii) an indication of time corresponding to the scheduled task, and
        (iii) an indication of a location corresponding to the scheduled task;
    retrieving mapping data in vector format for generating a default map image corresponding to the geographic location;
    determining that a difference between the application data time and the current time is below a threshold;
    in response to determining that the difference is below the threshold and without receiving a new mapping request from the client computing device:
        identifying features at the geographic location that are relevant specifically to the scheduled task, and
        modifying the retrieved mapping data to generate modified mapping data for generating a customized map image in which the identified features are displayed or modified in appearance;
    sending the modified mapping data to the client computing device via the network connection.

10. The method of claim 9, wherein the scheduled task is retrieved of a calendar application executing on the client device.

11. The method of claim 9, wherein generating the modified mapping data includes generating the modified mapping data that includes only the relevant graphic elements.

12. The method of claim 9, wherein the scheduled task data includes an airline reservation and the relevant graphic elements include one or more graphic elements representing a rental car return, a check in, a security checkpoint, and a gate.

13. The method of claim 9, further comprising receiving user preference data from the client computing device via the network, wherein the relevant graphic elements correspond to the retrieved user preference data.

14. The method of claim 9, further comprising retrieving user routine data and modifying the retrieved mapping data based on the received application data includes modifying the retrieved mapping data based on the retrieved user routine data.

15. The method of claim 9, wherein modifying the appearance of one or more graphic elements includes applying a visual style to vector data describing the one or more graphic elements.

16. A system for displaying graphic elements for mapping data of a digital map based on application data, the system comprising:
    a user task system including a processor and memory, the memory storing user scheduled task data that is generated or received by an application executing on a client computing device, wherein the user scheduled task data includes a task time and a task location;
    a mapping system including a processor and a memory, the memory storing mapping data that includes a plurality of graphic elements to represent a geographic location using a mapping application of a client computing device, the memory further storing instructions for execution by the mapping system processor to:
      receive a user mapping request for a digital map on the client computing device;
      receive a mapping data request, corresponding to the user mapping request, from the client computing device via a network connection, the mapping data request including a geographic location and a current time, wherein the mapping data request geographic location corresponds to the task location;
      retrieve mapping data that corresponds to the mapping data request geographic location;
      determine that a difference between the task time and the current time is below a threshold;
      identify features at the geographic location that are relevant specifically to the scheduled task;
      automatically modify, without receiving a new user mapping request, the retrieved mapping data to generate modified mapping data for generating a customized map image in which the identified features are displayed or modified in appearance; and
      send the modified retrieved mapping data to the client computing device via the network connection.

17. The system of claim 16, wherein to modify the appearance of one or more graphic elements, the instructions apply a visual style to vector data describing the one or more graphic elements.

* * * * *